Figure 1:
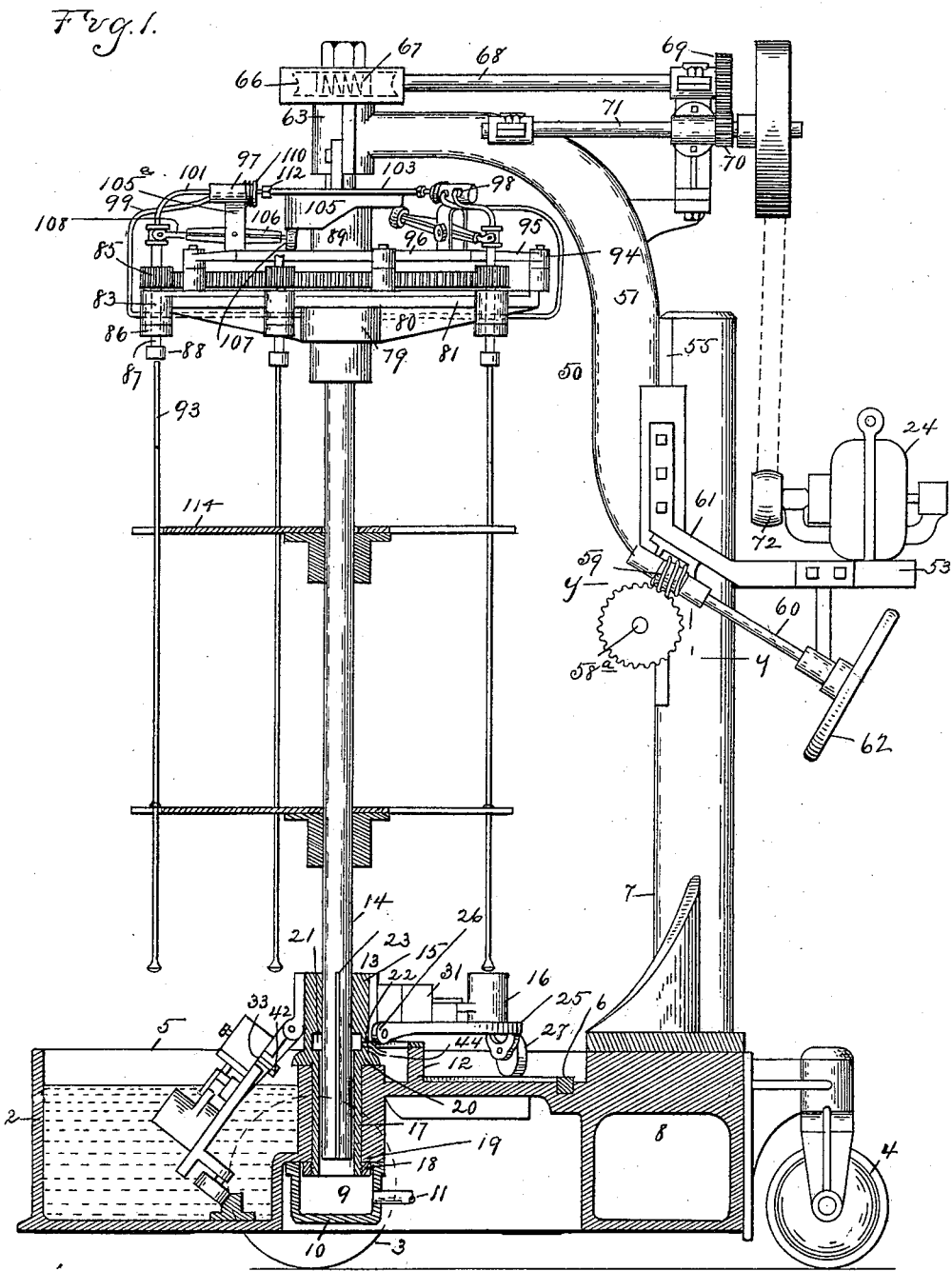

No. 659,726. Patented Oct. 16, 1900.
W. E. BOCK.
GLASS BLOWING MACHINE.
(Application filed Jan. 25, 1899. Renewed Apr. 30, 1900.)
(No Model.) 4 Sheets—Sheet 1.

Witnesses
Inventor
William Emil Bock

No. 659,726. Patented Oct. 16, 1900.
W. E. BOCK.
GLASS BLOWING MACHINE.
(Application filed Jan. 25, 1899. Renewed Apr. 30, 1900.)

(No Model.) 4 Sheets—Sheet 2.

Witnesses
A. L. Hubby
H. C. Smith.

Inventor
William Emil Bock
By Thos. S. Maguire
Attys.

No. 659,726. Patented Oct. 16, 1900.
W. E. BOCK.
GLASS BLOWING MACHINE.
(Application filed Jan. 25, 1899. Renewed Apr. 30, 1900.)

(No Model.) 4 Sheets—Sheet 3.

Witnesses

Inventor
William Emil Bock
By
Attys.

No. 659,726. Patented Oct. 16, 1900.
W. E. BOCK.
GLASS BLOWING MACHINE.
(Application filed Jan. 25, 1899. Renewed Apr. 30, 1900.)
(No Model.) 4 Sheets—Sheet 4.
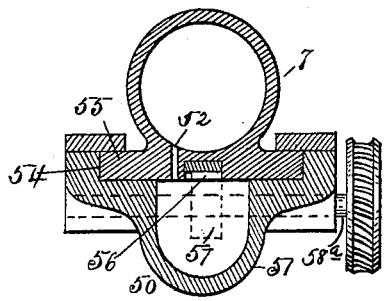
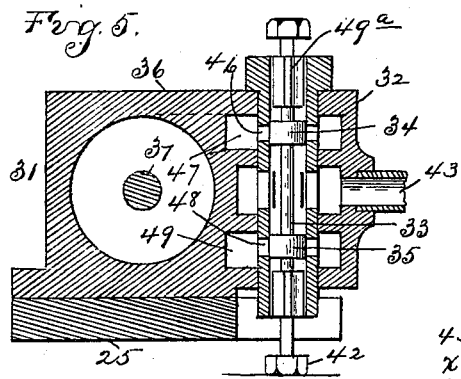
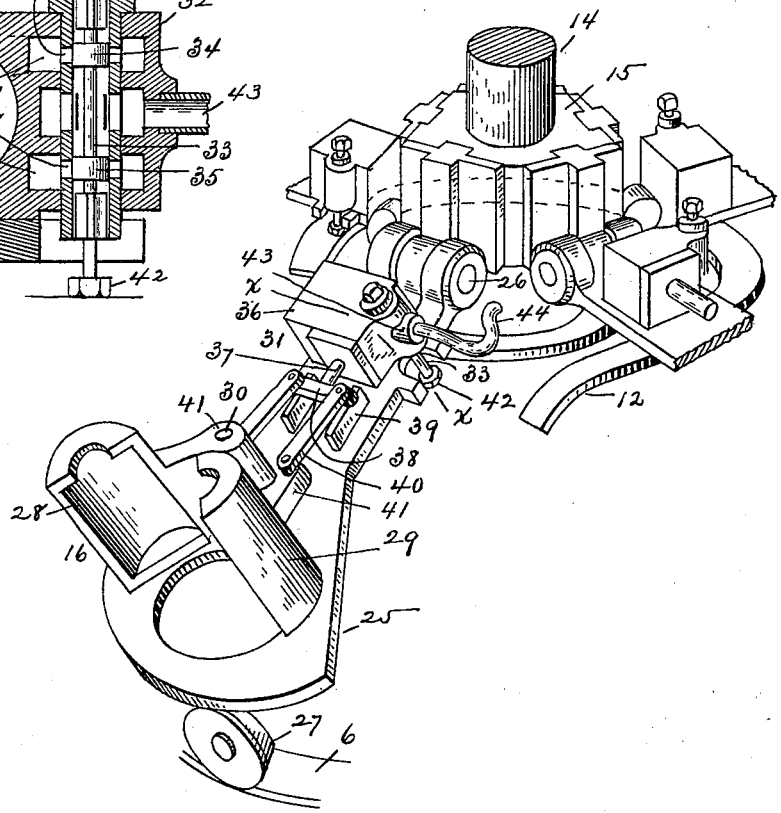
Witnesses
Inventor
William Emil Bock
By Atty's.

UNITED STATES PATENT OFFICE.

WILLIAM EMIL BOCK, OF TOLEDO, OHIO, ASSIGNOR TO THE TOLEDO GLASS COMPANY, OF SAME PLACE.

GLASS-BLOWING MACHINE.

SPECIFICATION forming part of Letters Patent No. 659,726, dated October 16, 1900.

Application filed January 25, 1899. Renewed April 30, 1900. Serial No. 14,917. (No model.)

*To all whom it may concern:*

Be it known that I, WILLIAM EMIL BOCK, a citizen of the United States, residing at Toledo, in the county of Lucas and State of Ohio, have invented certain new and useful Improvements in Glass-Blowing Machines, of which the following is a specification, reference being had therein to the accompanying drawings.

The invention has reference to glass-blowing machines; and it consists, essentially, in an improved operating mechanism for opening and closing the molds, in the means for adjusting the blowpipe-couplers, and the means employed for controlling the air-supply to the blowpipes.

The invention further consists in the novel arrangement and combination of the various parts of the machine, as will be more fully hereinafter described, and shown in the drawings, in which—

Figure 2:
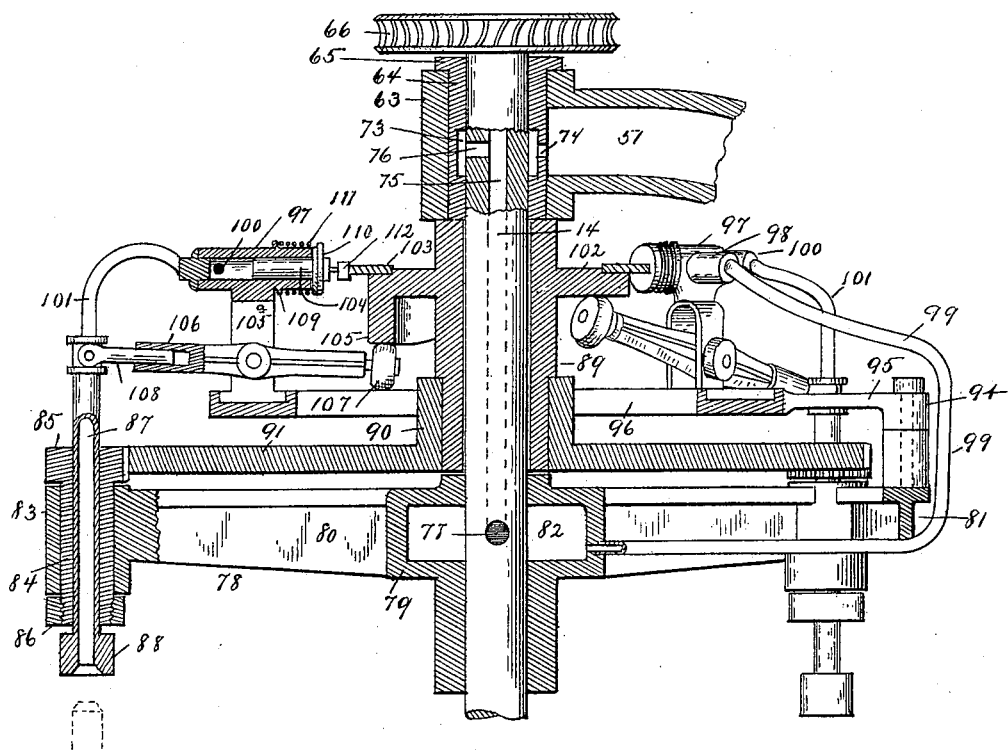
Figure 7:
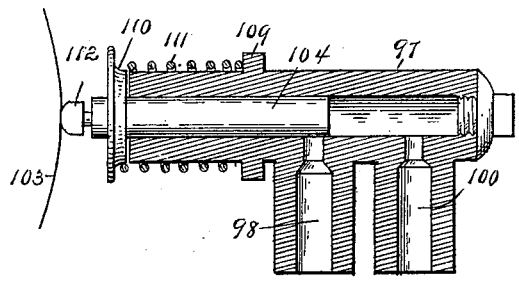
Figure 3:
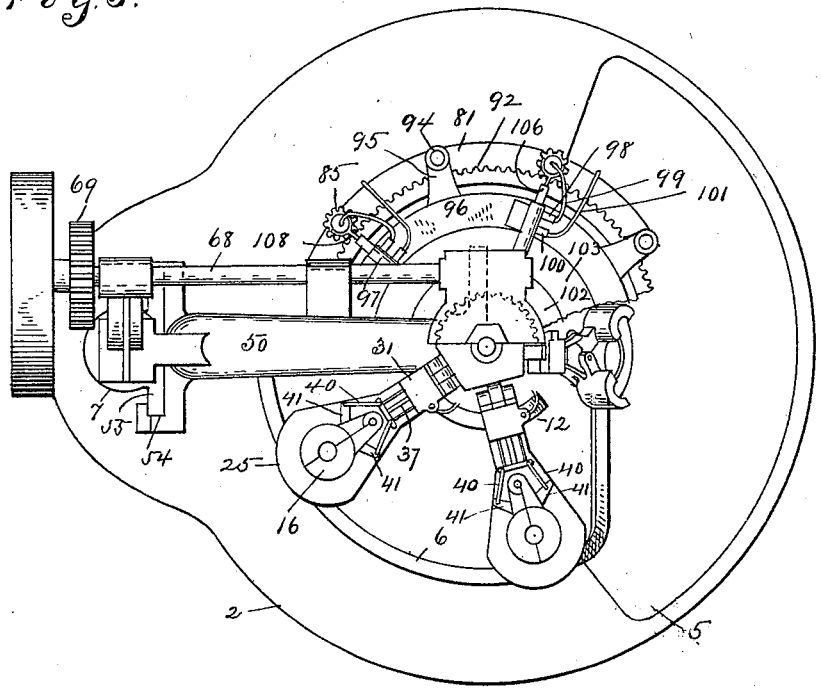

Figure 1 is a side elevation of my improved machine, showing the base thereof in section. Fig. 2 is an enlarged vertical section through the top of the machine. Fig. 3 is a plan view, one side being broken away to show the molds. Fig. 4 is a perspective view of the mold-carrier and one of the molds. Fig. 5 is a sectional view taken on line $x\ x$, Fig. 4, illustrating the peculiar construction of the independent motor for opening and closing the mold-sections. Fig. 6 is a section taken on line $y\ y$ of Fig. 1, and Fig. 7 is a longitudinal section of one of the valves controlling the air-supply to the blowpipe.

Referring to Figs. 1 and 3, the numeral 2 designates the base of the machine, which is substantially circular in configuration and is supported by casters 3 on each side of the base and a swiveled caster 4 in the front thereof. The base is provided with the usual tank 5, and upon said base and extending down into the tank is arranged a circular track 6, on which the mold-carriages are adapted to travel. A hollow standard 7 is arranged upon the base, and within the latter and below the standard is formed an air-chamber 8, which constitutes a storage-chamber for the air under low pressure, which passes through the blowpipe. The base is further provided with a chamber 9, formed by a cap 10, secured to the base in any suitable manner, which has an inlet 11, connected to a suitable source of air-supply. This chamber receives the air under high pressure for opening and closing the mold-sections. The base is still further provided with a cam-track 12, which controls the air-supply to said motors and is centrally recessed, as shown in Fig. 3. In the recess is arranged a casting 13, bored to receive the lower end of the main operating-shaft 14. In formation the casting consists of a circular head 15, to which a multiple of molds 16 are attached. The head extends above the base and is provided with a sleeve 17 of less cross-section than the head, which carries at its lower end a ring 18, bearing against an offset 19 in the base to prevent vertical movement of the head. A flange 20, formed on the casting, has a bearing on the top of the base, forming a support for said casing. An annular recess or chamber 21 is formed within the casing, into which the air from chamber 9 passes. This recess constitutes a common air-receptacle for the multiple molds.

The numeral 22 designates outlet-ports leading from the chamber.

The shaft is fitted tightly within the head of the casing, but is of lesser cross-section than the bore of the sleeve, whereby the air is enabled to pass freely from the storage-chamber 9 into the chamber 21. The shaft is likewise provided with a key 23, which engages the head of the casting to permit a vertical adjustment of the shaft and to prevent rotary movement of the latter within the head.

The sectional molds before referred to are preferably five in number, attached to the head, and are caused to travel in a circular path through the agency of an independent motor 24, which actuates the shaft to which the head is secured and which, together with the mechanism for rotating the molds, will be more fully described.

Ordinarily in glass-blowing machines where traveling molds are used it has been customary to open and close the molds either by hand or by means of a cam arranged in the path of the traveling mold-carriage for the purpose of actuating the mold-sections. In the latter construction the wear of the machine parts interferes materially with the proper opening and closing of the sections, and as the operation of the molds has been entirely dependent on the travel of the carriage too great a period of time must necessarily elapse before the sections can be operated. The means I employ for actuating the mold-sections overcome the existing defects in the present construction of machines of this type and consist, essentially, of an independent motor connected to the mold-sections, which instantly opens and closes the same at predetermined intervals.

More particularly, the construction of the mold and the actuating mechanism therefor is as follows:

The numeral 25 represents the mold-carriage, preferably in the form of a plate, which is connected to the head 15 by means of the hinge 26 and carries at its free end a wheel or roller 27, adapted to run on the track 6. Upon the plate are located the complementary mold-sections 28 and 29, pivoted to each other and to the plate by a pivot-pin 30, as plainly shown in Fig. 4. Between the mold and the hinged portion of the plate is arranged a motor 31, preferably in the form of a piston-motor for operating the sections. This motor comprises a valve-casing 32 and a piston-valve 33 therein, provided with the heads 34 and 35, a cylinder-casing 36, and a piston-rod 37 therein. The piston-rod, as shown, is provided with a cross-head 38, which slides in ways 39 on the plate, and links 40 connect said cross-head with lugs 41, formed on the mold-sections. The stem of the piston-valve projects downward below its casing substantially at right angles to the piston-rod 37, and the free end thereof is provided with a head 42, which is adapted to bear against the cam-track 12 and to be operated by said cam during the travel of the molds. Air is supplied to the several motors through inlet-ports 43, formed in their respective valve-casings, from the common air-receptacle 21, flexible couplings 44 connecting the ports just referred to with the outlet-ports in the common air-chamber. When the parts are in the position as shown in Fig. 5, the pressure of the air will be equal upon the heads 34 and 35, and the mold-sections will be inoperative. As soon as the valve-stem 33 is moved upwardly by means of the head 42 thereon bearing against the cam the air will pass from the inlet-port 43 through the port 46 into a port 47, which leads into one end of the cylinder-casing. The pressure of the air against the piston within the casing will actuate, through the agency of the cross-head and links, the mold-sections 28 29, causing the same to close about the article to be blown. The air within the casing upon the opposite side of the piston will be discharged in the usual manner through the ports 48 and 49.

49ª represents triangular guides upon the valve-stem.

The cam-track is so arranged upon the base that the valve-stem will be brought into contact with the former upon the travel of the mold-carriage after the mold leaves the tank. Said cam passes around the base, holding the valve-stems in their raised position, whereby the molds are closed by the air-pressure until they reach the opposite side of said tank, where the cam terminates, as plainly shown in Fig. 4. The valve-stems at this point by the action of gravity drop into such a position that the heads thereon cover the ports before opened and open the ports in the casing upon the opposite side of the piston, whereby the air will actuate said piston in the opposite direction and open the mold-sections before the latter commence their descent into the tank. By this construction it will be readily observed that means have been employed, operated by an independent motor, for instantly opening and closing the mold-sections and for performing this function after the molds have commenced their circular travel and before they make their descent within the tank. The shaft 14, which rotates the mold-carrying head 15 and which carries the blowpipe-couplers, is in turn supported by a movable section 50, which is secured to the standard 7 and adapted to be adjusted vertically thereon. In construction this section comprises a hollow curved arm 51, communicating with the hollow standard 7 through a perforation at 52, as plainly shown at Fig. 6, whereby constant communication is established with the standard, and hence the air-supply from the storage-chamber 8. Extending laterally from the lower portion of said arm is a bracket 53, upon which is located the motor 24, before referred to, which rotates the couplers and shaft. This arm or movable section is provided with guideways 54, Fig. 6, which engage laterally-extending guide-flanges 55 upon the standards, and the movable section is adjusted vertically upon the standard by means of the following mechanism:

56 represents a rack on the inner face of the standard, with which a pinion 57 on a shaft 58 engages, said shaft having bearings on the movable section, as shown. Upon the end of this shaft is arranged a worm-wheel 58ª, which is operated by the worm 59 on shaft 60. The latter shaft has bearings in the bracket-arms 61, depending from the movable section, as shown in Fig. 1.

62 represents a hand-wheel for operating the parts.

It will be observed from the construction as set forth that the movable section carries not only the motor which rotates the couplers, but likewise the adjusting mechanism for raising the same vertically relative to the standards 7.

The movable section terminates in a head 63, having a bearing formed therein, and within the bearing is arranged a sleeve 64, provided with an annular flange 65, which bears against the top of the head and holds the sleeve in proper position. The shaft 14 extends within the sleeve and carries, bearing upon the top of the latter, the horizontal worm-wheel 66, which retains the shaft within the head of the movable section, so that by vertically adjusting the latter the shaft, with the blowpipe-couplers thereon, will be raised or lowered, as may be desired. The worm-wheel referred to is operated by the worm 67 on the transverse shaft 68, provided with suitable bearings, and motion is imparted to said transverse shaft through the gear-wheel 69 and smaller gear-wheel 70 on a similarly-arranged shaft 71, which has a band connection between its drive-wheel 72 and the motor 24.

Within the stationary sleeve 64 is formed an annular recess 73, which communicates through a port 74 with the hollow movable section 51. The shaft 14 is provided with a central bore 75, which is constantly in communication with the air-supply from the chamber 8, said communication being established by means of a port 76, connecting the annular recess 73 with the bore.

77 is an outlet-port leading from the bore near the middle of the shaft.

Secured to the shaft 14 for the purpose of rotating with the latter is a casting 78, consisting of a hub 79, lateral arms 80, and a rim 81. An air-chamber 82 is formed within the hub, into which the port 77 from the bore 75 leads. This chamber forms a common receptacle for the air that passes through the blowpipes. A plurality of bearings 83, corresponding in number to the number of molds, is carried by the rim 81, in each of which is arranged a sleeve 84, carrying at the top a pinion 85 and provided with a nut 86, bearing against the lower end of the bearing to prevent vertical movement of the sleeve. Within the sleeves are the coupling-pipes 87, which are adapted to have a vertical sliding movement therein, and these are provided with the usual heads 88 which are adapted to engage with the blowpipes.

89 is a stationary sleeve upon the shaft 14, secured in any suitable manner to the head of the movable section 51. Upon this sleeve is secured a hub 90, provided with radial arms 91, which carry a continuous circular rack 92, with which the pinions 85 mesh as they are rotated by the shaft 14. The pinions in turn rotate the blowpipes 93, and the desired motion is thus given to the article that is to be blown. Mechanism for controlling the air-supply to the blowpipes is arranged and constructed in the following manner:

Upon the rim 81 is arranged a series of studs 94, provided each with an inwardly-extending arm 95. These arms carry a circular shelf 96, upon which are arranged the valve-casings 97, corresponding in number to the coupling-pipes. Each casing is provided with an inlet-port 98, and an air-inlet pipe 99 connects said inlet-port with the common air-supply chamber 82, as plainly shown in Fig. 2.

100 designates the outlet or exhaust port in the valve-casing, and a pipe 101 connects this port with its respective coupling-pipe, the connection between said coupling-pipe and the pipe 101 being a swivel-joint to permit of the rotation of the blowpipes.

The stationary sleeve 89 is provided with an annular flange 102, which carries the cam-ring 103, adapted to bear against and operate the valve-stems 104 within the valve-casings. The annular flange is likewise provided with a depending cam 105, the function of which will be hereinafter set forth.

Upon the side of each valve-casing and preferably extending through the standard 105ª thereof is pivoted a lever 106, the inner end of which carries a roller 107, and the outer end a suitable arm 108, which is secured to one of the coupling-pipes. The cam 105 just referred to is adapted to bear at certain intervals against each of these levers as they revolve with the shaft 14, thereby depressing the same for the purpose of raising the coupler-pipes out of engagement with the blowpipes to allow the latter to be removed and new ones inserted in their place.

As the construction of the valves which control the air-supply to the blowpipes is one of the features of my invention, the detail construction of the same will now be set forth.

Upon the valve-casing 97 is formed a shoulder 109, between which and the head 110 on the valve-stem 104 is interposed a coiled spring 111, acting normally to keep the inlet-port 98 open to admit the air within the casing and to the blowpipes. The opening and closing of this air-inlet port is controlled by the cam 103, against which a head 112 on the valve-stem normally bears.

114 represents the usual arms secured to the shaft 14, the ends of which are provided with suitable supporting devices and guides for the blowpipes.

The arrangement of the cam which controls the air-supply into the valves is such that as the valves rotate the air-supply therefor will be cut off by the cam just before the blowpipes reach the tank. At the same time, through the agency of the mechanism before set forth, the coupling-pipes are disconnected from the blowpipes and the mold-sections are opened, leaving the latter pipes upon their supporting-arms in readiness to be removed. After the molds have passed through the tank the independently-operating motors instantly close the sections about the article to be blown, the blowpipes are automatically connected through the agency of the coupler-pipes with the air-supply, and the valve-controlled cam is arranged to allow the air to gradually pass into the blowpipes and into the article to be blown.

What I claim as my invention is—

1. In a glass-blowing machine, the combination of a rotatable mold-carrier, a motor for rotating said carrier, a series of sectional molds on said carrier, a separate motor for operating each mold, and means, controlled by the rotary movement of the carrier, for actuating the motors to open and close the molds.

2. In a glass-blowing machine, the combination of a series of traveling mold-carriages and a motor therefor, a sectional mold upon each carriage, a motor for each mold fixedly secured to the carriage, and means for controlling the operation of the motors to open and close the molds.

3. In a glass-blowing machine, the combination of a rotatable mold-carrier having a storage-chamber formed therein, a motor for rotating the carrier, a series of sectional molds on said carrier, a separate fluid-motor for operating each mold, a fluid-supply connection between each motor and the storage-chamber, and means for automatically controlling the fluid-supply to the motors to open and close the molds.

4. In a glass-blowing machine, the combination of the main operating-shaft and a motor for rotating the same, a head upon the shaft having a storage-chamber formed therein, a series of mold-carriages hinged to the head, a sectional mold and a motor connected to the mold-sections upon each carriage, a flexible pipe connection between each motor and the storage-chamber, and means for controlling the discharge of air from the chamber to the motors.

5. In a glass-blowing machine, the combination of the sectional mold adapted to receive the article to be blown, an air-supply device communicating with the mold and adapted to supply air to the article therein, means for controlling the admission of air within the mold, a motor connected to the mold-sections, and means for controlling the operation of the motor to open and close the mold.

6. In a glass-blowing machine, the combination of the sectional mold, adapted to receive the article to be blown, an air-supply device communicating with the mold and adapted to supply air to the article therein, means for controlling the admission of air within the mold, a pneumatic piston-motor for opening and closing the mold, the piston being directly connected to the mold-sections, an independent air-supply mechanism for the motor, and means for controlling the said air-supply at stated periods to thereby control the opening and closing of the mold-section.

7. In a glass-blowing machine, the combination of a mold-carrier and a motor therefor, a series of sectional molds on said carrier adapted to receive the articles to be blown, an air-supply device communicating with each mold and adapted to supply air to the article therein, means for controlling the admission of air within the molds, a series of independent motors upon the carrier, one for each mold and connected to the mold-sections, and means for controlling the actuating agent of the motors to thereby control the opening and closing of the molds.

8. In a glass-blowing machine, the combination of a mold-carrier and a motor therefor, a series of sectional molds on said carrier adapted to receive the articles to be blown, an air-supply device communicating with each mold and adapted to supply air to the article therein, means for controlling the admission of air within the molds, a series of independent pneumatic piston-motors upon the carrier, one for each mold and having its piston connected to the mold-sections, an independent air-supply mechanism for the motors, and means for controlling the air-supply to thereby control the opening and closing of the molds.

9. In a glass-blowing machine, the combination of a standard, a movable section mounted thereon for vertical adjustment, and the blowpipe-couplers and motor for rotating said couplers, carried by said movable section.

10. In a glass-blowing machine, the combination of a standard, a movable section mounted thereon for vertical adjustment, the blowpipe-couplers carried by the section, a supporting-bracket carried by and extending laterally from said section, a motor for rotating the couplers arranged on said bracket, and a drive connection between the motor and couplers also carried by the section.

11. In a glass-blowing machine, the combination of a standard, a movable section arranged thereon for vertical adjustment, an air-supply, a coupling-pipe and a valve controlling the air-supply thereto carried by said section, and means for maintaining the air-supply through the standard and movable section to the valve.

12. In a glass-blowing machine, the combination of the base having a storage-chamber for the air formed therein, a hollow standard upon the base communicating with the air-chamber, a hollow movable section adjustably arranged upon the standard, means for maintaining communication between the standard and the section in its various positions of adjustment, a coupling-pipe carried by the section, a valve controlling the air-supply to said pipe, and connections between the movable section and the valve.

In testimony whereof I affix my signature in presence of two witnesses.

WILLIAM EMIL BOCK.

Witnesses:
J. P. JONES,
F. D. SUYDAM, Jr.